(12) United States Patent
Fujisawa

(10) Patent No.: US 9,047,573 B2
(45) Date of Patent: Jun. 2, 2015

(54) APPARATUS, METHOD, AND MEDIUM FOR DETERMINING EXECUTABILITY OF PROCESS DEFINITION TICKETS IN AN IMAGE FORMING APPARATUS

(75) Inventor: Minoru Fujisawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 13/061,628

(22) PCT Filed: Oct. 28, 2009

(86) PCT No.: PCT/JP2009/068860
§ 371 (c)(1),
(2), (4) Date: Mar. 1, 2011

(87) PCT Pub. No.: WO2010/050610
PCT Pub. Date: May 6, 2010

(65) Prior Publication Data
US 2011/0173623 A1 Jul. 14, 2011

(30) Foreign Application Priority Data
Oct. 31, 2008 (JP) ................................. 2008-282439

(51) Int. Cl.
*G06F 9/46* (2006.01)
*G03G 15/00* (2006.01)
(Continued)

(52) U.S. Cl.
CPC ................ *G06Q 10/00* (2013.01); *G03G 15/55* (2013.01); *G03G 15/5091* (2013.01); *G03G 15/5016* (2013.01); *G06F 3/1205* (2013.01); *G06F 3/1253* (2013.01); *G06F 3/1285* (2013.01)

(58) Field of Classification Search
None
See application file for complete search history.

(56) References Cited

U.S. PATENT DOCUMENTS

2006/0045555 A1* 3/2006 Morimoto et al. ............... 399/80
2007/0006123 A1* 1/2007 Matsui .......................... 717/101
(Continued)

FOREIGN PATENT DOCUMENTS

CN 101042753 A 9/2007
JP 2007-025953 A 2/2007
(Continued)

OTHER PUBLICATIONS

Dec. 28, 2009 International Search Report and Written Opinion in PCT/JP2009/068860.
(Continued)

*Primary Examiner* — Emerson Puente
*Assistant Examiner* — Paul Mills
(74) *Attorney, Agent, or Firm* — Fitzpatrick, Cella, Harper & Scinto

(57) ABSTRACT

A data processing apparatus that makes it possible for a user of a data processing apparatus to recognize whether or not descriptive contents of process definition tickets are executable on the data processing apparatus. Process definition tickets in which sequential processing flows for realizing functions are described are obtained, and it is determined whether or not the descriptive contents of the process definition tickets are executable on the data processing apparatus. A list of the process definition tickets whose descriptive contents have been determined as being executable on the data processing apparatus as a result of the determination is displayed in a manner being identifiable by the user. The user selects the process definition ticket whose descriptive contents are executable on the data processing apparatus from the list of the displayed process definition tickets, and the selection is received. The descriptive contents of the received process definition ticket are executed.

8 Claims, 9 Drawing Sheets

(51) Int. Cl.
  *G06Q 10/00* (2012.01)
  *G06F 3/12* (2006.01)

(56) References Cited

U.S. PATENT DOCUMENTS

| | | |
|---|---|---|
| 2007/0013943 A1 | 1/2007 | Sawayanagi et al. |
| 2007/0100990 A1* | 5/2007 | Brown et al. ............... 709/224 |
| 2007/0219839 A1 | 9/2007 | Tanabe |
| 2008/0052724 A1* | 2/2008 | Numata ...................... 718/107 |
| 2008/0055646 A1 | 3/2008 | Kawabata |
| 2008/0063423 A1 | 3/2008 | Matoba |
| 2008/0100610 A1* | 5/2008 | Murakami et al. ............. 345/418 |

FOREIGN PATENT DOCUMENTS

| | | |
|---|---|---|
| JP | 2007-257089 A | 10/2007 |
| JP | 2008-059489 A | 3/2008 |
| JP | 2008-065702 A | 3/2008 |

OTHER PUBLICATIONS

Feb. 27, 2013 Chinese Official Action in Chinese Patent Appln. No. 200980143823.7.

* cited by examiner

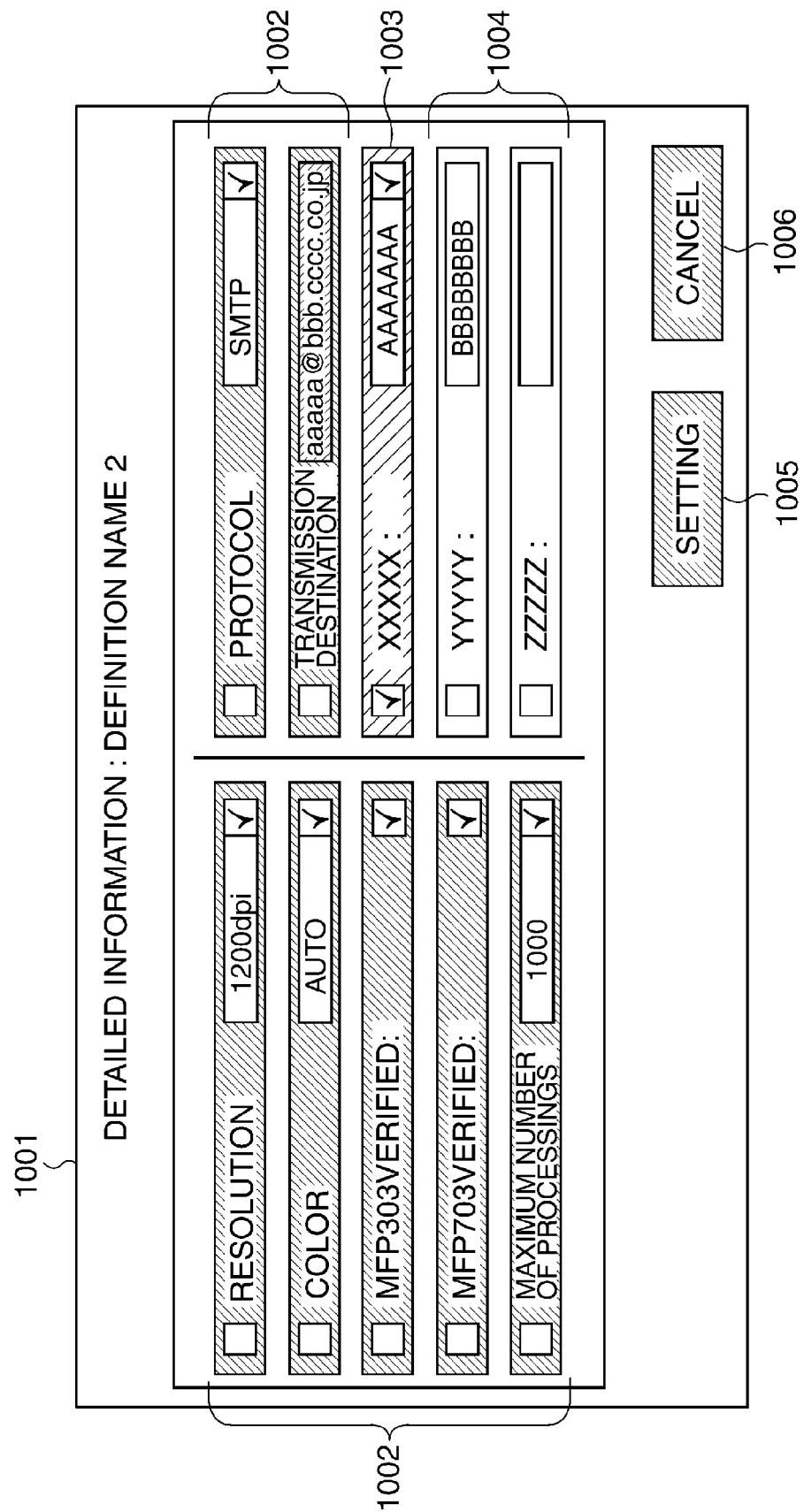

APPARATUS, METHOD, AND MEDIUM FOR DETERMINING EXECUTABILITY OF PROCESS DEFINITION TICKETS IN AN IMAGE FORMING APPARATUS

TECHNICAL FIELD

The present invention relates to a data processing apparatus and a data processing method that processes operations on a function-to-function basis, a computer-readable storage medium that stores a program for implementing the method, and a data processing system.

BACKGROUND ART

Now, there is an image processing system in which a scanner, a facsimile machine, a copy machine, or a multifunctional peripheral acting as a combination of these machines, a personal computer, a mail server, and so on are connected together via a network, and office processing is performed using their services cooperating with each other.

For example, according to a technique described in PTL (Patent Literature) 1, a workflow to be executed by an apparatus is created by classifying unit processes according to types of functions which the apparatus has and combining the processes. The apparatus performs processing in cooperation with other services according to the created workflow.

Moreover, there has been proposed an image processing system described hereafter. A user who administrates a predetermined range of domain obtains performance and settings of image forming apparatuses within the domain from the individual image forming apparatuses (or data processing apparatuses) within the domain and servers managing the image forming apparatuses using an administration terminal. Based on the obtained information on the individual image forming apparatuses, the user on the administration terminal generates definitions in an image processing operation to be processed on the individual image forming apparatuses.

At this time, the user on the administration terminal verifies the generated process definition ticket (in which processing performance and settings of the image forming apparatuses are described) and the obtained information on the image forming apparatuses. By doing this, the user on the administration terminal checks whether or not the process definition ticket is executable on the individual image forming apparatuses.

The user on the administration terminal registers the generated process definition ticket in a ticket management server that offers a directory service and so on. After that, in executing an operation using a specific image forming apparatus installed within the domain, a user obtains the process definition ticket from the server in which the process definition ticket is registered. Then, the image forming apparatus executes processing according to the definitions in the obtained process definition ticket. Finally, the image forming apparatus sends the definitions of the executed operation and data obtained as the processing result of the operation to an external communication apparatus.

In this manner, in the image processing system, the user on the administration terminal generates definitions in an image processing operation to be executed on the individual image processing apparatuses. By verifying the generated definitions and obtained information on the image forming apparatuses, the user on the administration terminal checks whether or not descriptive contents of the process definition ticket are executable on the individual image forming apparatuses. After that, the process definition ticket is used and executed on a specific image forming apparatus within the same domain by a user.

CITATION LIST

Patent Literature

{PTL 1} Japanese Laid-Open Patent Publication (Kokai) No. 2008-059489

SUMMARY OF INVENTION

Technical Problem

However, the user who use the image forming apparatus cannot check whether or not the descriptive contents of the process definition ticket are executable on the image forming apparatus before causing the descriptive contents of the process definition ticket to be executed. In other words, the user who uses the image forming apparatus cannot check whether or not the descriptive contents of the process definition ticket have been verified on the administration terminal.

If verified, the descriptive contents of the process definition ticket are executable on the image forming apparatus to be operated, but if not verified, the descriptive contents of the process definition ticket may be unexecutable on the image forming apparatus to be operated. As a result, when the user who operates the image forming apparatus executes an operation without recognizing that the descriptive contents of the process definition ticket are unexecutable, the execution fails.

Moreover, it is assumed that as individual operations in a process definition ticket, there are definitions editable by a user having administrator authority, and definitions editable by general users with their authority. There may be a case where, by changing definitions editable by users, the descriptive contents of the process definition ticket can be made executable on an image forming apparatus. However, when a user executes an operation without recognizing this and performing edition, the operation fails.

The present invention provides a data processing apparatus, a data processing method, a computer-readable storage medium that stores a program for implementing the method, and a data processing system that make it possible for a user of a data processing apparatus to be operated to recognize whether or not the descriptive contents of process definition tickets are executable on the data processing apparatus to be operated.

Solution To Problem

Accordingly, in a first aspect of the present invention, there is provided a data processing apparatus that executes descriptive contents of process definition tickets in which operation flows for realizing functions are described, comprising an obtaining unit that obtains the process definition tickets, a determination unit that determines whether or not the descriptive contents of the process definition tickets are executable on the data processing apparatus, a display unit that displays, in a manner being identifiable by a user, a list of the process definition tickets whose descriptive contents have been determined as being executable on the data processing apparatus as a result of the determination by the determination unit, a selection receiving unit that receives a selection of the process definition ticket whose descriptive contents are executable on the data processing apparatus by the user from the list of the process definition tickets displayed by the display unit, and an execution unit that executes the descriptive contents of the process definition ticket received by the selection receiving unit.

Advantageous Effects of Invention

According to the present invention, a user of the data processing apparatus to be operated can recognize whether or not the descriptive contents of process definition tickets are executable on the data processing apparatus to be operated.

Further features of the present invention will become apparent from the following description of exemplary embodiments (with reference to the attached drawings).

BRIEF DESCRIPTION OF DRAWINGS

FIG. 10 is a view showing an exemplary display of a user interface displayed when a detailed information button appearing in FIG. 9 is pressed.

DESCRIPTION OF EMBODIMENTS

Figure 1:
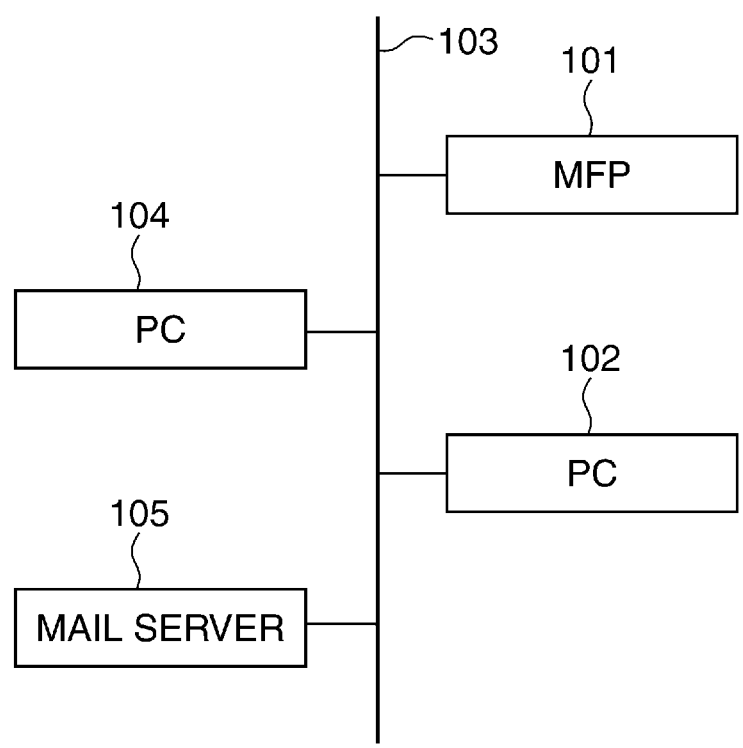
FIG. 1 is a diagram schematically showing an arrangement of a system including a data processing apparatus according to a first embodiment of the present invention.

The embodiments for carrying out the present invention will now be described in detail with reference to the drawings. It should be noted that the same components are designated by the same reference numerals, and description thereof is omitted.

A first embodiment of the present invention will now be described with reference to the drawings. First, referring to FIG. 1, a description will be given of an overall arrangement in which a controller envisaged in the present embodiment operates.

FIG. 1 is a diagram schematically showing an arrangement of a data processing system including a data processing apparatus according to the first embodiment of the present invention. A network in a user environment is a LAN 103, which is assumed to be Ethernet (registered trademark). A node having a plurality of network interfaces described below is connected to the LAN 103.

A multifunction peripheral (hereinafter referred to as the MFP) 101 is an image forming apparatus (multifunction apparatus) having a printer function, a scanner function, and so on. A detailed description of the hardware of the MFP 101 will be given later with reference to FIG. 2.

In the following description, the MFP as an image forming apparatus is taken as an example, but the present invention may also be applied to general data processing apparatuses that process data such as documents and images. Here, the data processing apparatuses are concepts encompassing image forming apparatuses.

A PC 102 and a PC 104 are general personal computers (information processing apparatuses). Main devices constituting the hardware of the PC 102 and the PC 104 will now be described.

There is a CPU (central processing unit) as a central arithmetic unit. There are a RAM (random access memory), a ROM (read-only memory), and an HDD (hard disk drive) as storage devices. Also, there is a CD-ROM drive (compact disc read-only memory) as an external storage device. There are an NIC (network interface card) and a USB host interface (universal serial bus) as external interfaces.

The data processing apparatus has a bus for controlling those devices and peripheral devices, to be described later. There are a mouse, a CRT display, a keyboard, and so on as peripheral devices connected to a main body of a personal computer. Software installed into the PC 102 functions mainly as office software such OS (operating software), word-processing software, and spreadsheet software.

The OS acts as a port monitor for sending print data to a printer and an MFP via a network. It is assumed that the OS has also installed therein a mailer for sending and receiving E-mails, for example, sending and receiving E-mails to and from a mail server 105, to be described later. The mail server 105 is an E-mail server, which is a server responsible for sending and receiving E-mails using SMTP (Simple Mail Transfer Protocol) and POPS (Post Office Protocol).

E-mail accounts of the MFP 101, the PC 102, and the PC 104 are set in the mail server 105, and values are set so that each node can send E-mails via the mail server 105.

The PCs, the mail server, and so on other than the MFP appearing in FIG. 1 are configured as general information processing apparatuses as described above.

Figure 2:
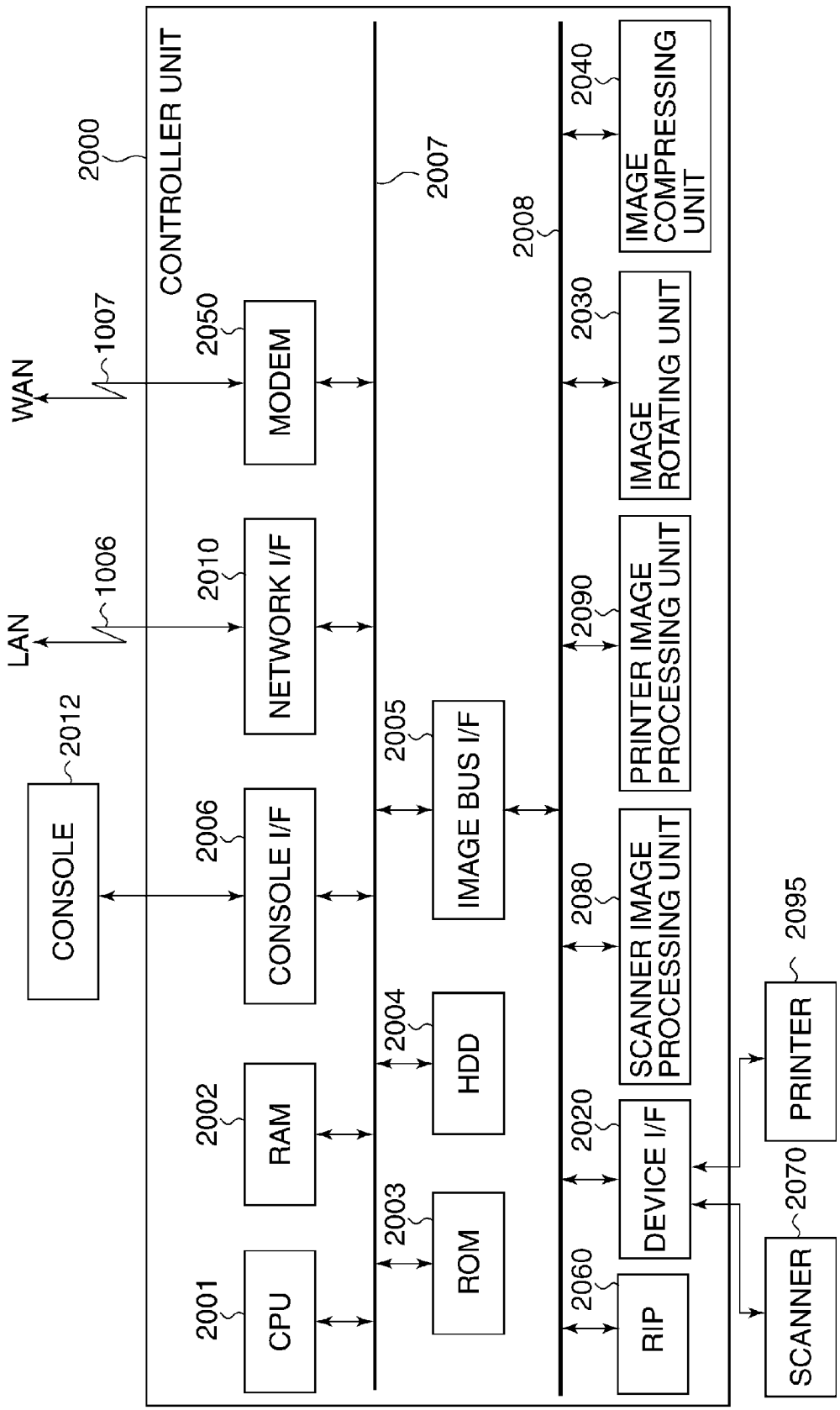
FIG. 2 is a block diagram schematically showing an arrangement of main components of a controller in an MFP.

FIG. 2 is a block diagram schematically showing an arrangement of main components of a controller in the MFP 101. A controller unit 2000 is connected with a scanner 2070, an image input device, and a printer 2095, an image output device, and provides control so as to realize a copy function of causing the printer 2095 to print out image data scanned by the scanner 2070. Also, the controller unit 2000 connects to a LAN 1006, thereby providing control so as to input and output image information and device information.

Specifically, the controller unit 2000 has a CPU 2001, which boots an operation system (OS) by a boot program stored in a ROM 2003. Then, the controller unit 2000 executes various kinds of processing by executing application programs stored in an HDD (hard disk drive) 2004 on the OS. The CPU 2001 uses a RAM 2002 as a work area. The RAM 2002 provides the work area as well as an image memory area for temporarily storing image data. The HDD 2004 stores the above-described application programs as well as image data. To the CPU 2001 are connected a console IF (console interface) 2006, a network IF (network interface) 2010, a modem 2050, and an image bus IF (image bus interface) 2005 via a system bus 2007.

The console IF 2006 is an interface for connecting to a console 2012 having a touch panel, and outputs, to the console 2012, image data to be displayed on the console 2012. The console IF 2006 sends out, to the CPU 2001, information input by a user on the console 2012.

The network IF 2010 is connected to the LAN 1006 (or the LAN 103) and inputs and outputs information to and from devices on the LAN 1006 via the LAN 1006. The modem 2050 is connected to a WAN 1007 such as a public line, and inputs and outputs information. The image bus IF 2005 is a bus bridge that connects to each other the system bus 2007 and an image bus 2008, which transfers image data at high speed, and transforms data structures. The image bus 2008 is comprised of a PCI bus or an IEEE 1394.

On the image bus 2008 are provided a raster image processor (hereinafter referred to as the RIP) 2060, a device IF 2020, a scanner image processing unit 2080, a printer image processing unit 2090, an image rotating unit 2030, a thumbnail creating unit 2035 (not shown), and an image compressing unit 2040 are provided. The RIP 2060 is a processor for expanding a PDL code into a bitmap image. The scanner 2070 and a printer (not shown) are connected to the device IF 2060, and the device IF 2020 performs synchronous-to-asynchronous conversion on image data.

The scanner image processing unit 2080 corrects, processes, and edits input image data. The printer image processing unit 2090 performs correction and resolution conversion on print output image data. The image rotating unit 2030 rotates image data. The image compressing unit 2040 compresses multi-valued image data into JPEG data and decompresses compressed JPEG data, and compresses binary image data into JBIG, MMR, or MH data and decompresses compressed JBIG, MMR, or MH data.

Figure 3:
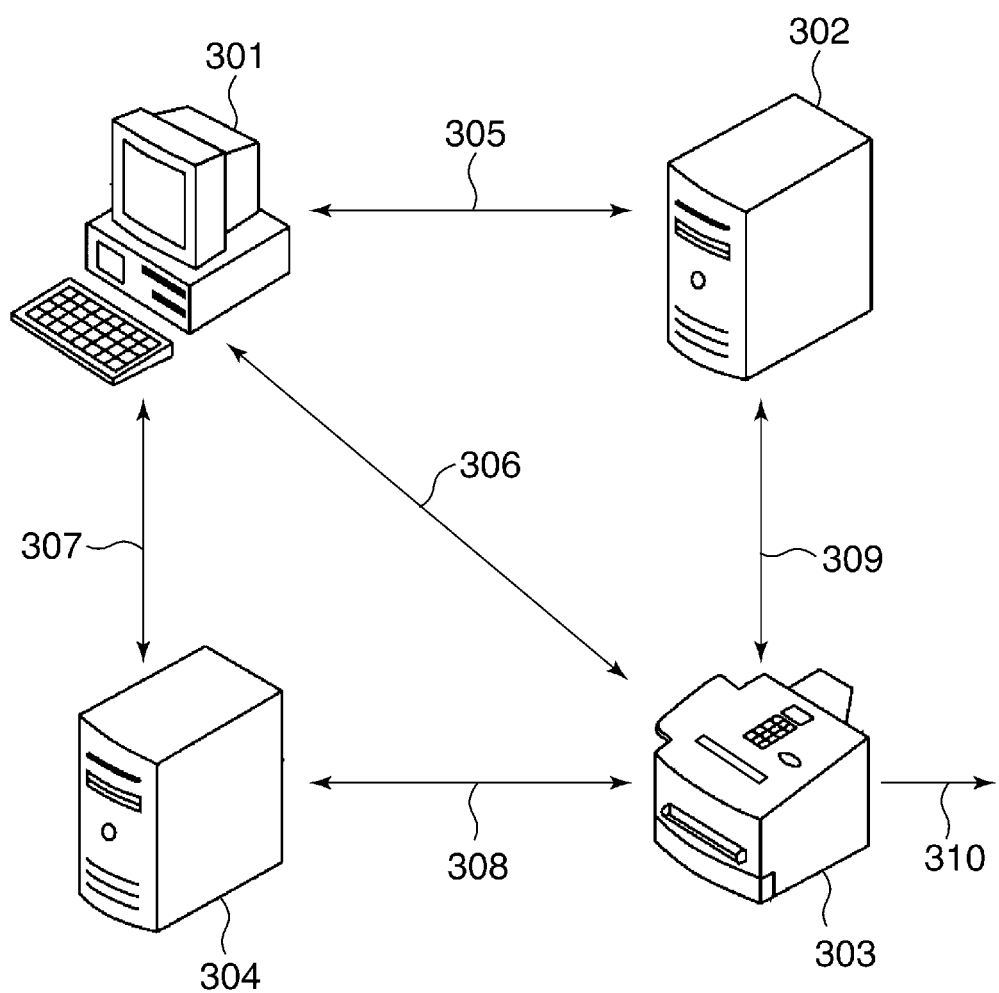
FIG. 3 is a view useful in explaining apparatus-to-apparatus operations with regard to main components of apparatuses.

FIG. 3 is a view useful in explaining apparatus-to-apparatus operations with regard to main components in the present embodiment. A terminal 301 is an administration terminal (the PC 102 or the PC 104 appearing in FIG. 1) operated by an administrator. It is assumed that the terminal 301 operates on an OS such as Windows (registered trademark) installed therein. A management server 302 is a ticket processing server that manages performance information, current settings, etc. on image forming apparatuses installed within the same domain. Also, the management server 302 has a function of sending image data, document data, and print jobs to other communication apparatuses using network protocols according to descriptive contents of process definition tickets generated by the administrator on the terminal 301.

An MFP 303 is a multifunction peripheral that perform such processing as printing and scanning. Also, the MFP 303 has a function of sending image data, document data, and print jobs processed by itself to other communication apparatuses using network protocols. Also, the MFP 303 acts as a directory service client, and has a function of reading information on individual users who use the MFP 303 and the descriptive contents of process definition tickets generated by the administrator on the terminal 301, and processing operations according to their definitions.

A process definition ticket is, for example, defined with regard to a workflow operation for scanning a document and converting the same into an image or a print job using an image forming apparatus and sending the image or the print job to an external communication apparatus. For example, settings such as information required for processing and information on resolution, a data transmission destination, and so on are defined. The data processing apparatus (image forming apparatus) to which the present invention is applied executes the descriptive contents of a process definition ticket in which a sequential operation flow for realizing a desired function is described.

A ticket management server 304 acts as a directory service server and so on, and has a function of managing information on users who log into the terminal 301 and the MFP 303 installed within the same domain. The ticket management server 304 has a function of registering and managing process definition tickets generated by the administrator on the terminal 301.

Reference numeral 305 designates processing in which the administrator on the terminal 301 requests performance information and current settings on the MFP 303 to the management server 302, and the management server 302 sends the corresponding information in response to the request.

Reference numeral 306 designates processing in which the administrator on the terminal 301 requests performance information and current settings on the MFP 303 to the MFP 303, and the MFP 303 sends the corresponding information in response to the request. Based on the obtained information, the administrator generates a process definition ticket to be executed on the MFP 303. In this instance, the administrator may perform verification using the obtained performance information and setting information so as to check whether or not the descriptive contents of the process definition ticket generated so as to be executed on the MFP 303 are actually executable on the MFP 303.

Here, the word "executable" means that, assuming that one of definitions in a process definition ticket is that scanning processing is performed at "a resolution of XXX dpi", and when the MFP 303 does not support this resolution, scanning processing cannot be performed at "a resolution of XXX pdi". As a result of the verification, it is determined that the descriptive contents of a process definition ticket are executable on the MFP 303, the terminal 301 sets "normally checked by the MFP 303" information in the process definition ticket.

In the first embodiment, the normally-checked information is information indicative of whether or not the descriptive contents of a process definition ticket to be checked are executable on an MFP to be operated. Thus, even the same process definition ticket is treated in different ways according to an MFP to be operated when it is executable and when it is unexecutable. When it is determined that the descriptive contents of a process definition tickets are unexecutable on the MFP 303, the "normally checked by the MFP 303" information is not set.

Reference numeral 307 designates a request for registration of a process definition ticket generated by the administrator on the terminal 301 in the ticket management server 304, and a response from the ticket management server 304. Also, reference numeral 307 designates a request for information on registered users within the same domain and a process definition ticket from the administrator on the terminal 301 to the ticket management server 304, and a response from the ticket management server 304.

The administrator registers a process definition ticket generated on the terminal 301 in the ticket management server 304 and manages the same. At this time, the "normally checked by the MFP 303" information is set in the process definition ticket. Moreover, to temporarily store definitions at the time of generation thereof, a process definition ticket in which the "normally checked by the MFP 303" information is not set can also be registered and managed in the terminal 301.

Reference numeral 308 designates a request for user information and a process definition ticket from the MFP 303 to the ticket management server 304 so that a user can use the MFP 303, and a response from the ticket management server 304. The MFP 303 obtains user information and process definition ticket information from the ticket management server 304 when a user logs into the MFP 303, or when carrying out a workflow operation such as scanning and transmission of data to an external communication apparatus.

Reference numeral 309 designates a request for registration of performance information and current setting information on the MFP 303 in the management server 302 from the MFP 303 to the management server 302 or from the management server 302 to the MFP 303, and a response from the management server 302. This makes it possible for the management server 302 to hold performance information and current setting information on the MFP 303 and respond to a request for information on the MFP 303 from the terminal 301.

Reference numeral 309 designates a request for transmission of data processed according to the descriptive contents of a process definition ticket by MFP 303 and information on the process definition ticket from the MFP 303 to the management server 302, and a response from the management server 302.

The MFP 303 checks the descriptive contents of a process definition ticket obtained from the ticket management server 304 for an operation to be executed by a user on the MFP 303 itself. The MFP 303 processes an operation according to definitions in only a process definition ticket that has been "normally checked by the MFP 303".

The MFP 303 sends created image data and data such as print jobs as processing results and a process definition ticket to the management server 302.

Reference numeral 310 designates a request for transmission of data processed according to the descriptive contents of a process definition ticket by the MFP 303 from the MFP 303 to an external communication apparatus. The MFP 303 checks the descriptive contents of a process definition ticket obtained from the ticket management server 304 for an operation to be executed by a user on the MFP 303 itself.

When the MFP 303 obtains a process definition ticket that has not been "normally checked by the MFP 303" from the ticket management server 304, the MFP 303 uses current performance information and setting information on the MFP 303 to check whether or not the descriptive contents of the process definition ticket are executable on the MFP 303.

As a result, when it is determined that the descriptive contents of the process definition ticket are executable on the MFP 303, the MFP 303 sets the "normally checked by the MFP 303" information in the process definition ticket. When it is determined that the descriptive contents of the process definition ticket are unexecutable on the MFP 303, the "normally checked by the MFP 303" information is not set.

The MFP 303 processes an operation according to definitions in only a process definition ticket that s been "normally checked by the MFP 303". The MFP 303 sends created image data and data such as print jobs as processing results to an external communication apparatus.

Figure 4:
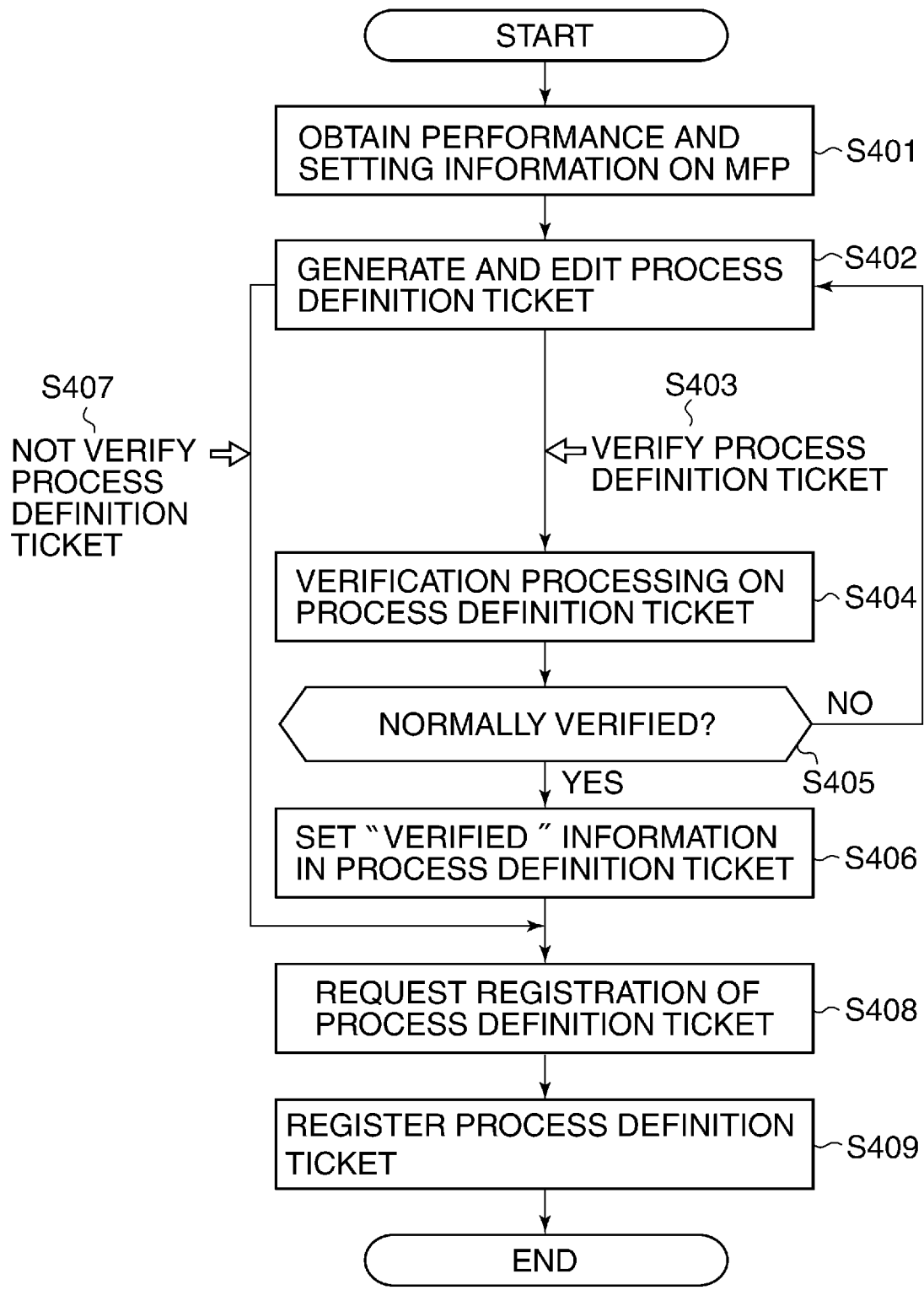
FIG. 4 is a flow chart showing procedures of a processing in which an administrator generates a process definition ticket on a terminal.

FIG. 4 is a flow chart showing procedures of a processing in which the administrator generates a process definition ticket on the terminal 301. Each step in the flow chart is executed under the control of a CPU of the terminal 301.

In step S401, to generate a process definition ticket whose descriptive contents are to be executed on the MFP 303, the terminal 301 obtains performance information and setting information on the MFP 303 from the management server 302 or the MFP 303. The administrator can check the obtained performance information and setting information on a display screen of the terminal 301.

In step S402, in response to operation by the administrator, the terminal 301 creates a process definition ticket whose descriptive contents are to be executed on the MFP 303 using the information obtained in the step S401.

In step S403, the administrator requests the terminal 301 to verify the process definition ticket so as to check whether or not the descriptive contents of the process definition ticket generated in the step S402 are executable on the MFP 303.

In step S404, in response to the verification request from the administrator, the terminal 301 checks whether or not the descriptive contents of the process definition ticket are executable on the MFP 303 by comparing the obtained various information with individual definitions in the generated process definition ticket.

In step S405, when the checking has normally ended, it is determined that the descriptive contents of the process definition ticket generated in the step S402 are executable on the MFP 303, and in step S406, the terminal 301 sets the "normally checked by the MFP 303" information in the process definition ticket.

On the other hand, in the step S405, when the checking has abnormally ended, it is determined that the descriptive contents of the process definition ticket generated in the step S402 are unexecutable on the MFP 303, and the "normally checked by the MFP 303" information is not set. In this instance, in the step S402, the terminal 301 prompts the administrator to generate and edit a process definition ticket again.

In step S407, there may be a case where, when temporarily storing a process definition ticket at the time of generation thereof, the administrator does not have to check whether or not the descriptive contents of the process definition ticket created by himself/herself are executable on the MFP 303. In such a case, the administrator notifies the terminal 301 accordingly (step S407), followed by the program proceeding from the step S402 to step S408.

In the step S408, the terminal 301 requests the ticket management server 304 to register the generated process definition ticket. In step S409, the terminal 301 registers the administrator information held by the terminal 301 as well as the generated process definition ticket in the ticket management server 304.

As a result, when an operation is to be executed on the MFP 303, the MFP 303 can recognize whether or not the descriptive contents of a process definition ticket obtained from the ticket management server 304 is executable on the MFP 303. It should be noted that a process definition ticket generating flow in a second embodiment, to be described later, is the same as the present flow.

Figure 5:
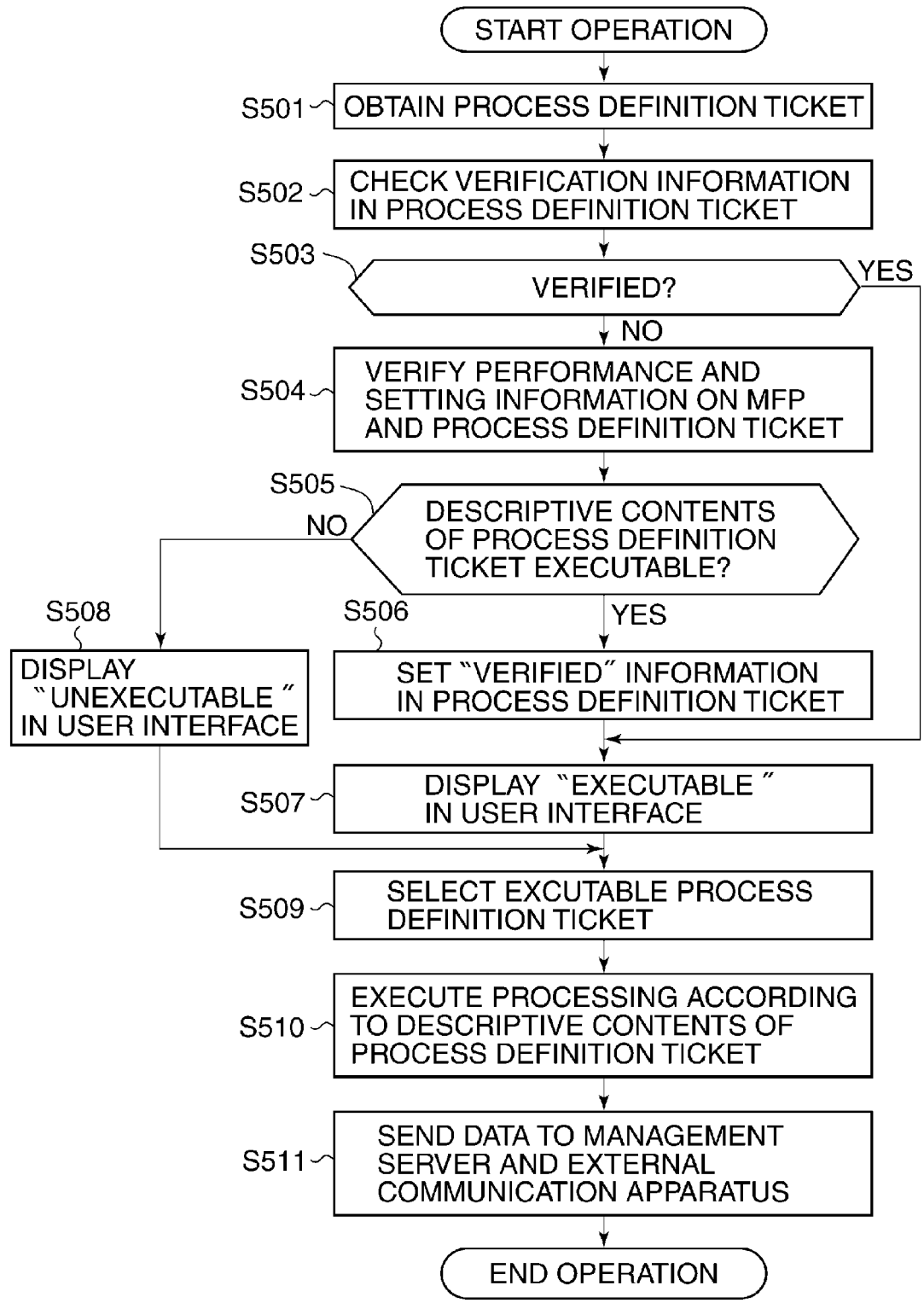
FIG. 5 is a flow chart showing procedures of a processing from start to end of an operation by a user on the MFP.

FIG. 5 is a flow chart showing procedures of processing from start to end of an operation by a user on the MFP 303 in the first embodiment. The steps in the flow chart are executed under the control of a CPU provided in the MFP 303.

In step S501, the MFP 303 executes a workflow operation such as scanning and data transmission to an external communication apparatus. To that end, the MFP 303 obtains, from the ticket management server 304, all user information and process definition tickets that can be obtained with authority of the MFP 303 or the authority of a user who logs into and operates the MFP 303.

In step S502, the MFP 303 checks the descriptive contents of the process definition tickets obtained from the ticket management server 304, and determines whether or not the process definition tickets have been normally checked by the administrator.

In step S503, when the process definition tickets have been normally checked (verified) by the administrator, they are displayed as "process definition tickets whose descriptive contents are executable on MFP 303" in a user interface on the MFP 303 in step S507.

On the other hand, in the step S503, when the process definition tickets have not been normally checked (verified) by the administrator, this means that verification of the concerned process definition tickets has not been normally completed for the MFP 303. This means that verification has been performed for the MFP 303 but has abnormally ended, or verification itself has not been performed at all. Even when verification has abnormally ended, there may be a case where the arrangement and performance of the MFP 303 change from the time of the verification. Therefore, in step S504 (third determination unit), the user checks again whether or not the descriptive contents of the process definition tickets are executable on the MFP 303 using the current performance information and setting information on the MFP 303.

As a result of the rechecking as to whether or not the descriptive contents of the process definition tickets are executable on the MFP 303, when it is determined in step S505 (third determination unit) that the descriptive contents of the process definition tickets are executable on the MFP 303, the normally-checked-by-the MFP 303 (verified) information is set in the process definition tickets in step S506. Then, in the step S507, they are displayed as "process definition tickets whose descriptive contents are executable on MFP 303" in a user interface on the MFP 303.

On the other hand, when it is determined in the step S505 that the descriptive contents of the process definition tickets are unexecutable on the MFP 303, they are displayed as "process definition tickets whose descriptive contents are unexecutable on MFP 303" in a user interface in the MFP 303 in step S508.

In the present embodiment, the user who is executing an operation on the MFP 303 can recognize a list of process definition tickets whose descriptive contents are executable on the MFP 303 through a user interface display.

In step S509, the user who is executing the operation selects any of "process definition tickets whose descriptive contents are executable on MFP 303" displayed in the user interface. According to the selection, the MFP 303 selects a process definition ticket whose descriptive contents should be executed.

In step S510, triggered by the user's selection in the step S509, the MFP 303 executes the operation according to the descriptive contents of the selected process definition ticket.

In step S511, the MFP 303 sends data (scan data, print job, etc.) generated in the step S510 as well as the process definition ticket to the management server 304 and an external communication apparatus.

As described above, in the present embodiment, the MFP 303 can execute operations according to the descriptive contents of process definition tickets having the normally-checked (verified) information.

Figure 6:
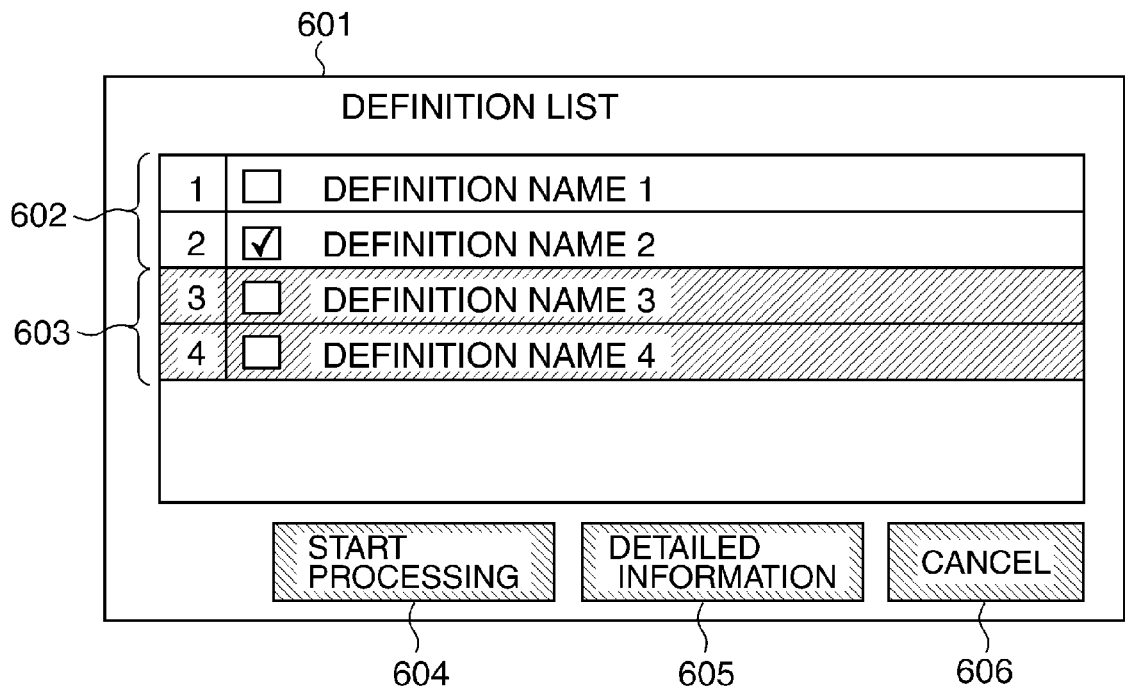
FIG. 6 is a flow chart showing an exemplary display of a user interface in step S507 and step S508.

FIG. 6 is a view showing an exemplary display in a user interface (selection receiving screen) in the step S507 and the step S508.

Reference numeral 601 designates a list of all the process definition tickets obtained from the ticket management server 304 by the MFP 303 in the step S501.

Reference numeral 602 designates process definition tickets whose descriptive contents are executable on the MFP 303. Referring to FIG. 6, for example, among the process definition tickets whose descriptive contents are executable, there are two process definition tickets whose descriptive contents are executable on the MFP 303.

Reference numeral 603 designates process definition tickets whose descriptive contents are unexecutable on the MFP 303, which are described above in the description of the step S508. Referring to FIG. 6, for example, there are two process definition tickets whose descriptive contents are unexecutable. Here, the process definition tickets whose descriptive contents are unexecutable may be hidden by configuring the MFP 303 accordingly.

Reference numeral 604 designates an operation start button. The user selects a desired process definition ticket whose descriptive contents are executable from the process definition tickets 602 whose descriptive contents are executable, and then presses the operation start button 604. As a result, the MFP 303 executes an operation according to the descriptive contents of the selected process definition ticket.

Reference numeral 605 designates a button for displaying detailed information on a process definition ticket. Upon the user selecting any process definition ticket and pressing the detailed information button 605, the MFP 303 displays detailed information on the selected process definition ticket.

Reference numeral 606 designates a cancel button for an operation execution initialization processing and the process definition ticket list 601. By pressing the cancel button 606, the user cancels the operation execution initialization processing and exits the display of the process definition ticket list (601).

The second embodiment will be described with reference to FIG. 7 and subsequent figures. It should be noted that a process definition ticket creation processing executed by the administrator in the second embodiment is the same as that of the first embodiment described with reference to FIG. 4, and therefore description thereof is omitted.

Figure 7:
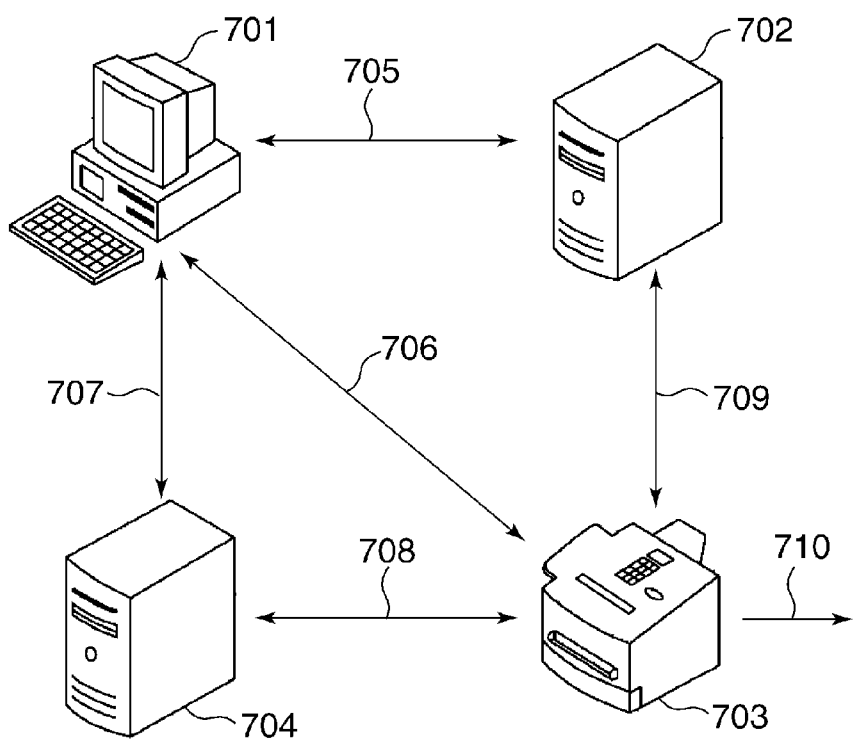
FIG. 7 is a view useful in explaining apparatus-to-apparatus operations with regard to main components of apparatuses in a second embodiment of the present invention.

FIG. 7 is a view useful in explaining apparatus-to-apparatus operations with regard to their main parts in the second embodiment.

A terminal 701 is an administration terminal operated by an administrator. It is assumed that the terminal 701 operates on an OS such as Windows (registered trademark) installed therein.

A management server 702 is a ticket processing server that manages performance information, current settings, etc. on image forming apparatuses such as an MFP 703 installed within the same domain. Also, the management server 702 has a function of sending image data, document data, and print jobs to other communication apparatuses using network protocols according to the descriptive contents of process definition tickets generated by the administrator on the terminal 701.

The MFP 703 is a multifunction peripheral that can execute such processings as printing and scanning. The MFP 703 has a function of sending image data, document data, and print jobs processed by itself to other communication apparatuses using network protocols.

Also, the MFP 703 acts as a directory service client, and has a function of reading information on individual users who use the MFP 703 and the descriptive contents of process definition tickets generated by the administrator on the terminal 701, and processing operations according to their definitions.

As definitions in process definition tickets, definitions editable by only the administrator and definitions editable by other general users as well can be set and generated distinctively from each other.

A user who uses the MFP 703 (including an administrator) can edit the descriptive contents of the process definition tickets on the MFP 703. When the descriptive contents of the process definition tickets are to be edited on the MFP 703, editable definitions and uneditable definitions are determined according to user types.

The MFP 703 has a user interface for displaying a list of process definition tickets defined so as to be executed on the MFP 703, and a user interface for editing the descriptive contents of process definition tickets. When the descriptive contents of process definition tickets are to be edited, the MFP 703 checks the authority of a user who logs into and operates the MFP 703 and displays editable definitions and uneditable definitions distinctively from each other.

A ticket management server 704 acts as a directory service server and so on, and has a function of managing information on users who log into the terminal 701 and the MFP 703 installed within the same domain.

Also, the ticket management server 704 has a function of registering and managing process definition tickets generated by the administrator on the terminal 701 and so on.

Reference numeral 705 designates a process in which on the terminal 701, the administrator requests the management server 702 to provide performance information and current settings on the MFP 703, and the management server 702 responds to the request and sends the corresponding information.

Reference numeral 706 designates a process in which on the terminal 701, the administrator requests the MFP 703 to provide performance information and current settings on the MFP 703, and the MFP 703 responds to the request and sends the corresponding information.

Based on the obtained information, the administrator generates a process definition ticket to be executed on the MFP 703. In this instance, the administrator can perform verification using the obtained performance information and setting information so as to check whether or not the descriptive contents of the process definition ticket generated so as to be executed on the MFP 703 are actually executable on the MFP 703.

As a result of the verification, when it is determined that the descriptive contents of the process definition ticket are executable on the MFP 703, the terminal 701 sets the "normally checked by the MFP 303" information in the process definition tickets.

The normally-checked information in the second embodiment is information indicative of whether or not the descriptive contents of a process definition ticket to be checked are executable on an MFP to be operated. Therefore, even the same process definition ticket is treated in different ways according to an MFP to be operated when it is executable and when it is unexecutable. On the other hand, when it is determined that the descriptive contents of a process definition tickets are unexecutable on the MFP 703, the "normally checked by the MFP 303" information is not set.

Further, as individual definitions in a generated process definition ticket, the administrator can set definitions editable by only the administrator and definitions editable by other general users as well distinctively from each other. A user who uses the MFP 703 (including the administrator) can edit the descriptive contents of the process definition ticket on the MFP 703.

Reference numeral 707 designates a request for registration of a process definition tickets generated by the administrator on the terminal 701 in the ticket management server 704, and a response from the ticket management server 704. Reference numeral 707 designates an administrator's request for transmission of information on registered users and process definition tickets within the same domain from the ticket management server 704 to the terminal 701, and a response from the ticket management server 704.

The administrator registers a process definition ticket generated on the terminal 701 in the ticket management server 704 and manages them. At this time, the "normally checked by the MFP 303" information is set in the process definition ticket. Moreover, to temporarily store definitions at the time of execution thereof, a process definition ticket in which the "normally checked by the MFP 303" is not set can also be registered and managed on the terminal 701.

Reference numeral 708 designates a request for user information and a process definition tickets from the MFP 703 to the ticket management server 704 so that a user can use the MFP 703, and a response from the ticket management server 704. The MFP 703 requests to obtain user information and process definition ticket information from the ticket management server 704 when a user logs into the MFP 703 itself, or when carrying out a workflow operation such as scanning and transmission of data to an external communication apparatus.

Reference numeral 709 designates a request for registration of performance information and current setting information on the MFP 703 in the management server 702 from the MFP 703 to the management server 702, and a response from the management server 702. This makes it possible for the management server 702 to hold performance information and current settings on the MFP 703 and respond to a request for information on the MFP 703 from the terminal 701.

Reference numeral 709 designates a request for data processed according to the descriptive contents of a process definition ticket as well as the process definition ticket from the MFP 703 to the management server 702, and a response from the management server 702. In response to operation performed by a user on the MFP 703, the MFP 703 checks the descriptive contents of the process definition ticket obtained from the ticket management server 704.

When the MFP 703 obtains a process definition ticket that has not been "normally checked by the MFP 703" from the ticket management server 704, the MFP 703 checks whether or not the descriptive contents of the process definition ticket are executable on the MFP 703. In this instance, the MFP 703 performs the checking using the current performance information and setting information on the MFP 703 itself.

As a result, when it is determined that the descriptive contents of the process definition ticket are executable on the MFP 703, the MFP 703 sets the "normally checked by the MFP 303" information in the process definition ticket. When it is determined that the descriptive contents of the process definition ticket are unexecutable on the MFP 703, the MFP 703 checks authority to edit individual definitions in the process definition ticket.

Also, the MFP 703 checks the authority of a user who logs into and operates the MFP 703. As a result, there may be a case where the user has the authority to edit the individual definitions in the process definition ticket, and by editing these definitions, the descriptive contents of the process definition ticket can be made executable on the MFP 703.

In the present embodiment, the MFP 703 displays a "process definition ticket whose descriptive contents are executable", a "process definition ticket whose descriptive contents are made executable by editing them", and a "process definition ticket whose descriptive contents are unexecutable irrespective of whether or not they are edited" distinctively from one another.

By editing the descriptive contents of a process definition ticket based on the editorial authority of a user, the user can change the "process definition ticket whose descriptive contents are made executable by editing them" to a "process definition ticket whose descriptive contents are executable".

The MFP 703 sets the "normally checked by the MFP 303" information in the process definition ticket changed to the "process definition ticket whose descriptive contents are executable". When it is determined that the descriptive contents of the process definition ticket are unexecutable on the MFP 703, the "normally checked by the MFP 303" information is not set.

The MFP 703 processes an operation according to definitions in only a process definition ticket that has been "normally checked by the MFP 303". The MFP 703 sends created data such as image data and print jobs as well as the process definition tickets as processing results to an external communication apparatus.

Reference numeral 710 designates a request for transmission of data processed according to the descriptive contents of a process definition ticket from the MFP 703 to an external communication apparatus. The MFP 703 checks the descriptive contents of a process definition ticket obtained from the ticket management server 704 for an operation to be executed by a user on the MFP 703 itself.

The MFP 703 processes an operation according to definitions in only a process definition ticket that has been "normally checked by the MFP 303". The MFP 703 sends created data such as image data and print jobs as processing results to an external communication apparatus.

Figure 8:
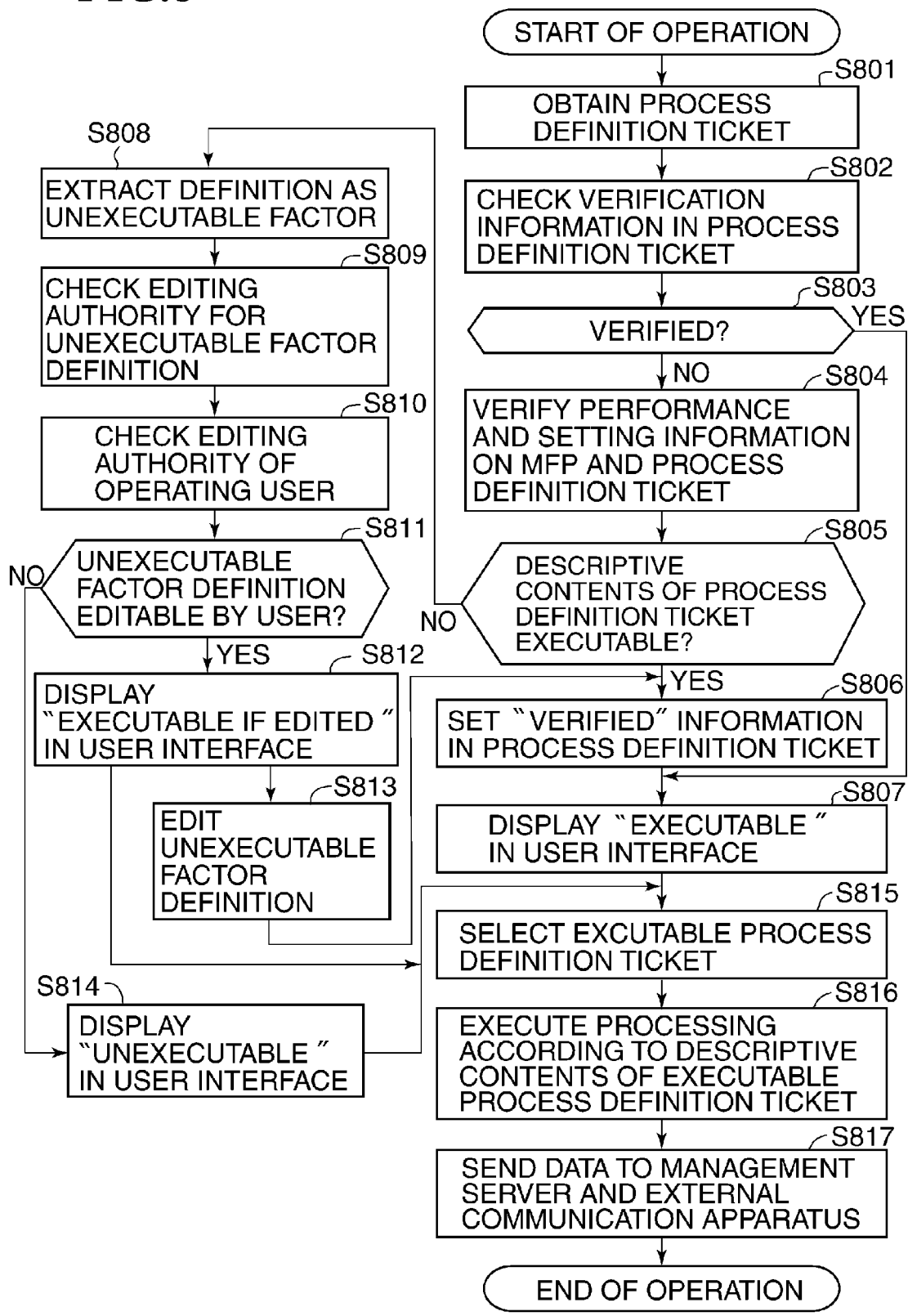
FIG. 8 is a flow chart showing procedures of a processing from start to end of an operation by a user on the terminal in the present embodiment.

FIG. 8 is a flow chart showing procedures of processing from start to end of an operation by a user on the MFP 703 in the present embodiment. Each step in the flow chart of FIG. 8 is executed under the control of a CPU provided in the MFP 703.

In step S801, the MFP 703 executes a workflow operation such as scanning and transmission of data to an external communication apparatus. To that end, the MFP 703 obtains from the ticket management server 704 all user information and process definition tickets that can be obtained with the authority of the MFP 703 itself or the authority of a user who logs into and operates the MFP 703 itself.

In step S802, the MFP 703 checks the descriptive contents of the process definition tickets obtained from the ticket management server 704.

In step S803, the MFP 703 determines whether or not the process definition tickets have been normally checked (verified) by the administrator. When the process definition tickets have been normally checked (verified), they are displayed as "process definition tickets whose descriptive contents are executable on the MFP 703" in a user interface of the MFP 703.

On the other hand, when it is determined in the step S803 that the process definition tickets have not been normally checked (verified), this means that verification of the concerned process definition tickets has not normally ended for the MFP 703. This means that verification has been performed for the MFP 703 but has abnormally ended, or verification itself has not been performed at all. Even when verification has abnormally ended, there may be a case where the arrangement and performance of the MFP 703 change from a time point at which verification is performed. Therefore, in step S804, the user checks again whether or not the descriptive contents of the process definition tickets are executable on the MFP 703 using the current performance information and setting information on the MFP 703.

As a result of the rechecking as to whether or not the descriptive contents of the process definition tickets are executable on the MFP 703, it is determined in step S805 whether or not the descriptive contents of the process definition tickets are executable on the MFP 703. When it is determined that the descriptive contents of the process definition tickets are executable on the MFP 703, the normally checked (verified) information is set in the process definition tickets in step S806. Then, in step S807, they are displayed as "process definition tickets whose descriptive contents are executable on MFP 703" in a user interface of the MFP 703.

On the other hand, when it is determined in the step S805 that the descriptive contents of the process definition tickets are unexecutable on the MFP 703, all individual definitions in the process definition tickets which are factors playing a role in making the descriptive contents of the process definition tickets unexecutable are extracted in step S808.

In step S809, the MFP 703 checks the authority to edit all the individual definitions (factor definitions) extracted in the step S808.

In step S810, the MFP 703 checks a process definition ticket editorial authority of a user who logs into and operates the MFP 703 itself. Such authority may be, for example, determined in advance within the system. As a result, the MFP 703 can analyze whether or not all the individual definitions extracted in the step S808 are editable by the user.

In step S811 (second determination unit), the MFP 703 determines whether or not all the individual factor definitions are editable by the user. When it is determined that all the individual factor definitions are editable by the user, the MFP 703 displays them as "process definition tickets whose descriptive contents are executable on the MFP 703" in a user interface of the MFP 703 in step S812.

In step S813, when the user edits the process definition tickets that are "process definition tickets whose descriptive contents are executable on the MFP 703", the MFP 703 sets the normally-checked (verified) information in the process definition tickets (S806). Then, in the step S807, the MFP 703 displays them as "process definition tickets whose descriptive contents are executable on the MFP 703" in a user interface of the MFP 703.

Unless the user edits the descriptive contents of the process definition tickets displayed as "process definition tickets whose descriptive contents are executable on the MFP 703" in the step S812, the MFP 703 cannot execute the descriptive contents of the concerned process definition tickets.

When it is determined in the step S811 that all the individual factor definitions are not editable by the user, the MFP 703 displays them as "process definition tickets whose descriptive contents are unexecutable on the MFP 703" in a user interface of the MFP 703.

In the present embodiment, a user who is executing the operation on the MFP 703 can recognize via a user interface a list of process definition tickets executable by the user.

In step S815, the user who is executing the operation selects any of the "process definition tickets whose descriptive contents are executable on the MFP 703" displayed on the user interface. In response to this, the MFP 703 selects a process definition ticket that should be executed.

In step S816, triggered by the user's selection in the step S815, the MFP 703 executes the operation according to the selected process definition ticket.

In step S817, the MFP 703 sends data (scan data, print jobs, and so on) generated in the step S816 and the process definition ticket to the management server 704 and an external communication apparatus. Thus, the MFP 703 can execute the operation according to only the descriptive contents of the process definition ticket holding the normally checked (verified) information.

Figure 9:
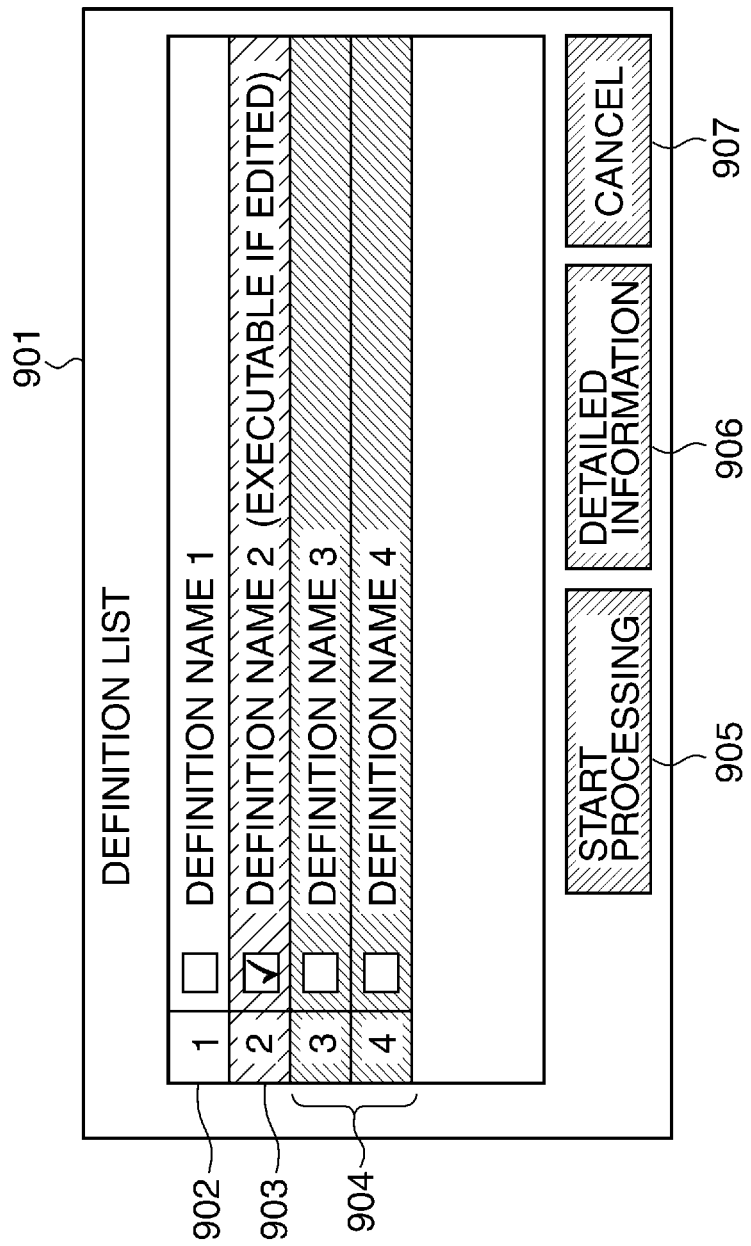
FIG. 9 is a view showing an exemplary display of a user interface in step S807, step S812, and step S814.

FIG. 9 is a view showing an exemplary user interface display in the step S807, the step S812, and the step S814.

Reference numeral 901 designates a list of all the process definition tickets obtained from the ticket management server 704 by the MFP 703.

Reference numeral 902 designates a process definition ticket whose descriptive contents are executable on the MFP 703 in the step S807. Referring to FIG. 9, for example, there is one process definition ticket whose descriptive contents are executable on the MFP 703.

Reference numeral 903 designates a process definition ticket whose descriptive contents are made executable by the user editing them on the MFP 703 in the step S812. Referring to FIG. 9, for example, there is one process definition ticket 903 whose descriptive contents are made executable by the user editing them on the MFP 703.

Reference numeral 904 designates process definition tickets whose descriptive contents are unexecutable on the MFP 703 in the step S814. Referring to FIG. 9, for example, there are two process definition tickets whose descriptive contents are unexecutable on the MFP 703. The process definition tickets whose descriptive contents are unexecutable on the MFP 703 may be hidden by configuring the MFP 703 accordingly.

Reference numeral 905 designates an operation start button. In response to the user selecting a desired process definition ticket whose descriptive contents are to be executed on the MFP 703 from the process definition tickets 902 whose descriptive contents are executable, and then pressing the operation start button 905, the MFP 303 executes an operation according to the descriptive contents of the selected process definition ticket.

Reference numeral 906 designates a button for displaying detailed information on a process definition ticket. In response to the user selecting any process definition ticket and pressing the detailed information button 906, the MFP 703 displays detailed information on the selected process definition ticket.

Reference numeral 907 designates a cancel button for operation execution initialization processing and the process definition ticket list 901. By pressing the cancel button 907, the user cancels the operation execution initialization processing and exits the display of the process definition ticket list 901.

FIG. 10 is a view showing an exemplary user interface display (second display) provided when the user selects the process definition ticket 903 whose descriptive contents are made executable by the user editing them and presses the detailed information button 906.

Reference numeral 1001 designates a display of a list of detailed information on individual definitions in the process definition ticket.

Reference numeral 1002 designates detailed information on individual definitions in the process definition ticket. The definitions 1002 are "editable by only an administrator" and not editable by users.

For example, referring to FIG. 10, there are seven definitions "editable by only an administrator". The definitions "editable by only an administrator" may be hidden through a setting in the MFP 703.

Reference numeral 1003 designates detailed information on individual definitions in the process definition ticket as is the case with the definitions 1002. The definition 1003 is "editable by an administrator and users". Further, the definition 1003 is a factor in playing a role in making the descriptive contents of the process definition ticket (definition name 2) unexecutable.

For example, referring to FIG. 10, there is one definition that is "editable by an administrator and users" and is a factor playing a role in making the descriptive contents of the process definition ticket (definition name 2) unexecutable. Reference numeral 1004 designates detailed information on individual definitions in the process definition ticket.

Moreover, the definitions 1004 are "editable by an administrator and users", and further, the definitions 1004 are not related to factors playing a role in making the descriptive contents of the process definition ticket (definition name 2) unexecutable.

For example, referring to FIG. 10, there are two definitions that are "editable by an administrator and users" and are not related to factors playing a role in making the descriptive contents of the process definition ticket (definition name 2) unexecutable.

Reference numeral 1005 designates a setting button for applying and storing the contents of edition when the user edits detailed information in a process definition ticket.

Reference numeral 1006 designates a cancel button for canceling the contents of edition and exits a user interface showing detailed information on a process definition ticket when the user edits detailed information in the process definition ticket.

Referring to FIG. 10, in response to the user editing the definition 1003 that plays a role in making the descriptive contents of the process definition ticket unexecutable, the MFP 703 changes the "process definition ticket whose descriptive contents are made executable by editing them on the MFP 703" to a "process definition ticket whose descriptive contents are executable on the MFP 703". Then, the MFP 703 sets verified information in the process definition ticket.

However, depending on the way of edition by the user, there may be a case where the "process definition ticket whose descriptive contents are executable on the MFP 703" is changed to a "process definition ticket whose descriptive contents are made executable by editing them on the MFP 703". The MFP 703 performs checking on this change.

As described above, according to the present invention, it is possible for a user to ascertain whether or not it has been verified on an administration terminal that the descriptive contents of a process definition ticket are executable on an image forming apparatus to be operated.

If verified, the descriptive contents of the process definition ticket are executable on the image forming apparatus to be operated by the user. On the other hand, if not verified, the process definition ticket is verified using present processing performance information and setting information on the image forming apparatus to be operated, so that it is checked whether or not the process definition ticket are executable on the image forming apparatus to be operated.

Thus, it is possible to display process definition tickets whose descriptive contents are executable on an image forming apparatus to be operated, process definition tickets whose descriptive contents are made executable through edition by a user, and process definition tickets whose descriptive contents have to be edited by an administrator, respectively. As a result, the user can execute an operation by selecting any of the displayed process definition tickets and editing and processing the selected process definition ticket.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

REFERENCE SIGNS LIST 301, 701 Terminal
302, 702 Management server
303, 703 MFP
304, 704 Ticket management server

The invention claimed is:

1. A data processing apparatus that executes data processing according to descriptive contents of process definition tickets in which a series of operation flows for an image forming apparatus are described, and that is connected to an administration terminal having a determination unit configured to determine whether or not the descriptive contents of the process definition tickets are executable on the data processing apparatus, the data processing apparatus comprising:
an obtaining unit configured to obtain the process definition tickets from the administration terminal;
a second determination unit configured to, when the determination unit determines that the descriptive contents of the process definition tickets are unexecutable on the data processing apparatus, determine, based on at least an authority of a user operating the data processing apparatus, whether or not the unexecutable descriptive contents of the process definition tickets are editable by the user to be made executable;
a display unit configured to, as a result of the determination of the determination unit, display, in a manner identifiable by the user as a list of the process definition tickets, the process definition tickets whose descriptive contents are determined as being executable on the data processing apparatus and the process definition tickets whose descriptive contents are determined as being unexecutable on the data processing apparatus, wherein the display unit further visually indicates in the list respectively which of the process definition tickets are process definition tickets whose descriptive contents are determined, by said second determination unit, as being editable by the user to be made executable;
a selection receiving unit configured to receive a selection of one or more of the process definition tickets by the user from the list of the process definition tickets displayed by said display unit; and
an execution unit configured to execute the descriptive contents of the process definition tickets received by said selection receiving unit.

2. The data processing apparatus according to claim 1, further comprising a second display unit configured to display a screen of the process definition tickets editable by the user when the process definition tickets whose descriptive contents are determined as being editable by the user to be made executable is selected.

3. The data processing apparatus according to claim 2, wherein said display unit displays, in response to an editing result by the user on the screen displayed by said second display unit, the process definition tickets whose descriptive contents are determined as being editable by the user as the process definition tickets whose descriptive contents are determined as being executable on the data processing apparatus.

4. The data processing apparatus according to claim 1, wherein the authority of the user is determined in advance.

5. The data processing apparatus according to claim 1, further comprising a third determination unit configured to, when the determination unit determines that the descriptive contents of the process definition tickets are unexecutable on the data processing apparatus, obtain information indicative of present performance of the data processing apparatus and determine whether or not the descriptive contents of the process definition tickets are executable on the data processing apparatus again based on the information.

6. A data processing method implemented by a data processing apparatus that executes data processing according to descriptive contents of process definition tickets in which a series of operation flows for an image forming apparatus are described, and that is connected to an administration terminal having a determination unit configured to determine whether or not the descriptive contents of the process definition tickets are executable on the data processing apparatus, the data processing method comprising:
an obtaining step in which an obtaining unit of the data processing apparatus obtains the process definition tickets from the administration terminal;
a determining step in which a second determination unit of the data processing apparatus, when the determination unit determines that the descriptive contents of the process definition tickets are unexecutable on the data processing apparatus, determines, based on at least an authority of a user operating the data processing apparatus, whether or not the unexecutable descriptive contents of the process definition tickets are editable by the user to be made executable;
a display step in which a display unit of the data processing apparatus, as a result of the determination of the determination unit, displays, in a manner identifiable by the user as a list of the process definition tickets, the process definition tickets whose descriptive contents are determined as being executable on the data processing apparatus and the process definition tickets whose descriptive contents are determined as being unexecutable on the data processing apparatus, wherein the display unit further visually indicates in the list respectively which of the process definition tickets are process definition tickets whose descriptive contents are determined, by said second determination unit, as being editable by the user to be made executable;
a selection receiving step in which a selection receiving unit of the data processing apparatus receives a selection of one or more of the process definition tickets by the user from the list of the process definition tickets displayed in said display step; and
an execution step in which an execution unit of the data processing apparatus executes the descriptive contents of the process definition tickets received in said selection receiving step.

7. A non-transitory computer-readable storage medium storing a program for implementing a data processing method for causing a computer as a data processing apparatus to function to execute data processing according to descriptive contents of process definition tickets in which a series of operation flows for an image forming apparatus are described, and that is connected to an administration terminal having a determination unit that determines whether or not the descriptive contents of the process definition tickets are executable on the data processing apparatus, the data processing method comprising:

an obtaining step of obtaining the process definition tickets from the administration terminal;

a determining step of, when the determination unit determines that the descriptive contents of the process definition tickets are unexecutable on the data processing apparatus, determining, based on at least an authority of a user operating the data processing apparatus, whether or not the unexecutable descriptive contents of the process definition tickets are editable by the user to be made executable;

a display step of displaying, in a manner identifiable by the user as a list of the process definition tickets, the process definition tickets whose descriptive contents are determined as being executable on the data processing apparatus and the process definition tickets whose descriptive contents are determined as being unexecutable on the data processing apparatus, wherein the display step further visually indicates in the list respectively which of the process definition tickets are process definition tickets whose descriptive contents are determined, in said determining step, as being editable by the user to be made executable;

a selection receiving step of receiving a selection of one or more of the process definition tickets by the user from the list of the process definition tickets displayed in said display step; and an execution step of executing the descriptive contents of the process definition tickets received in said selection receiving step.

8. A data processing system comprising:

a data processing apparatus that executes data processing according to descriptive contents of process definition tickets in which a series of operation flows for an image forming apparatus are described, and that is connected to an administration terminal having a determination unit configured to determine whether or not the descriptive contents of the process definition tickets are executable on the data processing apparatus, the data processing apparatus comprising:

an obtaining unit configured to obtain the process definition tickets from the administration terminal;

a second determination unit configured to, when the determination unit determines that the descriptive contents of the process definition tickets are unexecutable on the data processing apparatus, determine, based on at least an authority of a user operating the data processing apparatus, whether or not the unexecutable descriptive contents of the process definition tickets are editable by the user to be made executable;

a display unit configured to, as a result of the determination of the determination unit, display, in a manner identifiable by the user as a list of the process definition tickets, the process definition tickets whose descriptive contents are determined as being executable on the data processing apparatus and the process definition tickets whose descriptive contents are determined as being unexecutable on the data processing apparatus, wherein the display unit further visually indicates in the list respectively which of the process definition tickets are process definition tickets whose descriptive contents are determined, by said second determination unit, as being editable by the user to be made executable;

a selection receiving unit configured to receive a selection of one or more of the process definition tickets by the user from the list of the process definition tickets displayed by said display unit; and an execution unit configured to execute the descriptive contents of the process definition tickets received by said selection receiving unit; and wherein the administration terminal further comprises:

a generation unit that obtains information indicative of performance of said data processing apparatus and generates process definition tickets, a verification unit that verifies that the process definition tickets generated by the generation unit are executable on said data processing apparatus, a setting unit that sets information indicative of the verification by the verification unit in the process definition tickets generated by the generation unit, and a storage unit that stores the process definition tickets set by the setting unit.

* * * * *